US012318812B2

(12) United States Patent
Newman et al.

(10) Patent No.: US 12,318,812 B2
(45) Date of Patent: Jun. 3, 2025

(54) APPARATUSES, METHODS, AND SYSTEMS FOR VIBRATORY SCREENING

(71) Applicant: Derrick Corporation, Buffalo, NY (US)

(72) Inventors: Christian Newman, Buffalo, NY (US); Kurt Stodolka, Cheektowaga, NY (US)

(73) Assignee: Derrick Corporation, Buffalo, NY (US)

( * ) Notice: Subject to any disclaimer, the term of this patent is extended or adjusted under 35 U.S.C. 154(b) by 0 days.

(21) Appl. No.: 18/412,140

(22) Filed: Jan. 12, 2024

(65) Prior Publication Data

US 2024/0238845 A1 Jul. 18, 2024

Related U.S. Application Data

(60) Provisional application No. 63/438,899, filed on Jan. 13, 2023.

(51) Int. Cl.
*B07B 1/30* (2006.01)
*B07B 1/46* (2006.01)

(52) U.S. Cl.
CPC .............. *B07B 1/4609* (2013.01); *B07B 1/30* (2013.01)

(58) Field of Classification Search
None
See application file for complete search history.

(56) References Cited

U.S. PATENT DOCUMENTS 5,248,043 A 9/1993 Dorn
6,634,505 B1 * 10/2003 Sawall .................. F16B 5/0036 209/408
7,296,685 B2 * 11/2007 Malmberg ............ B07B 1/4609 399/408
7,942,272 B2 5/2011 Fisher
7,959,009 B2 * 6/2011 Weaver ................. B07B 1/4645 209/412
8,505,737 B2 * 8/2013 Malmberg ............ B07B 1/4645 209/412
8,561,803 B2 10/2013 Fallon
8,800,779 B2 * 8/2014 Wardell ................ B07B 1/4645 209/412
9,962,739 B2 * 5/2018 Malmberg ................ B07B 1/48
2005/0189265 A1 * 9/2005 Malmberg ................ B07B 1/46 209/363
2008/0078701 A1 * 4/2008 Carr .......................... B07B 1/46 209/313

(Continued)

FOREIGN PATENT DOCUMENTS

CN 211964937 U 11/2020

OTHER PUBLICATIONS

International Search Report and Written Opinion issued in App. No. PCT/US2024/011482, dated Jun. 13, 2024, 14 pages.

*Primary Examiner* — Joseph C Rodriguez
(74) *Attorney, Agent, or Firm* — FisherBroyles, LLP; Jason P. Mueller

(57) ABSTRACT

Disclosed embodiments include a screen deck assembly that can be mounted on a vibratory screening machine. The screen deck assembly includes a plurality of elongated support members that extend in a first direction. A plurality of support rods are mounted to the elongated support members. The support members and support rods form a screen support surface. The support rods extend in a direction that is transverse to the support members.

20 Claims, 11 Drawing Sheets

(56) References Cited

U.S. PATENT DOCUMENTS

| | | | | |
|---|---|---|---|---|
| 2021/0339284 | A1 | 11/2021 | Colgrove | |
| 2022/0118482 | A1* | 4/2022 | Freissle | B07B 1/4645 |
| 2024/0375148 | A1* | 11/2024 | Newman | B07B 1/4609 |

* cited by examiner

APPARATUSES, METHODS, AND SYSTEMS FOR VIBRATORY SCREENING

CROSS-REFERENCE TO RELATED APPLICATIONS

This application claims the benefit of U.S. Provisional Patent Application No. 63/438,899, filed Jan. 13, 2023, the disclosure of which is incorporated herein by reference in its entirety.

DETAILED DESCRIPTION

Disclosed embodiments generally relate to screen decks assemblies for screening materials and for separating materials of varying sizes. Disclosed embodiments include one or more screen decks and supported screen assemblies for use with vibratory screening machines.

Exemplary vibratory screening systems are disclosed, for example, in U.S. Pat. Nos. 6,431,366 B2 and 6,820,748 B2, which are incorporated herein by reference.

In an embodiment, a screen deck assembly that can be mounted on a vibratory screening machine is provided. The screen deck assembly includes a plurality of elongated support members that extend in a first direction. A plurality of support rods are mounted to the elongated support members. The support members and support rods form a screen support surface. The support rods extend in a direction that is transverse to the support members.

In an embodiment, a vibratory screening machine includes a vibratory motor assembly secured to and configured to vibrate an inner frame of the vibratory screening machine. At least one screen deck assembly, is configured to receive one or more replaceable screen assemblies. The screen deck(s) include a plurality of stringers arranged substantially parallel to one another. A plurality of support rods are mounted to the stringers. Each support rod extends between and is coupled to at least two of the stringers. The stringers and support rods are configured to support one or more overlying screen assemblies. The screen assemblies may be secured to the screen deck assemblies by tensioning the screen assemblies, for instance, in a direction that a material to be screened flows across the screen assemblies or in a direction transverse that the material to be screened flows across the screen assemblies. An undersized material-discharge assembly may be configured to receive materials that pass through the screen assemblies, and an oversized material-discharge assembly may be configured to receive materials that pass over a top surface of the screen assemblies.

Figure 1:
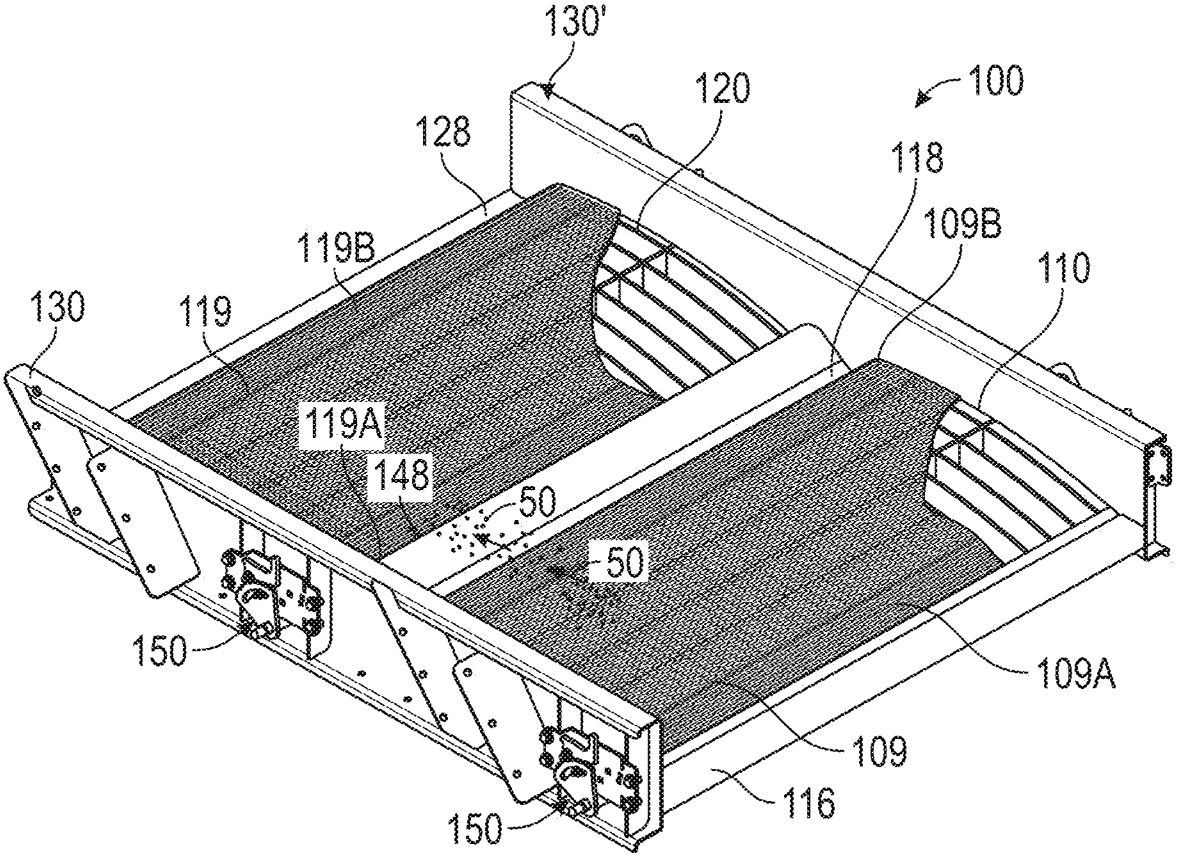
FIG. 1 is an isometric view of a screening deck having screen assemblies mounted thereon, according to an embodiment of the present disclosure.
Figure 2:
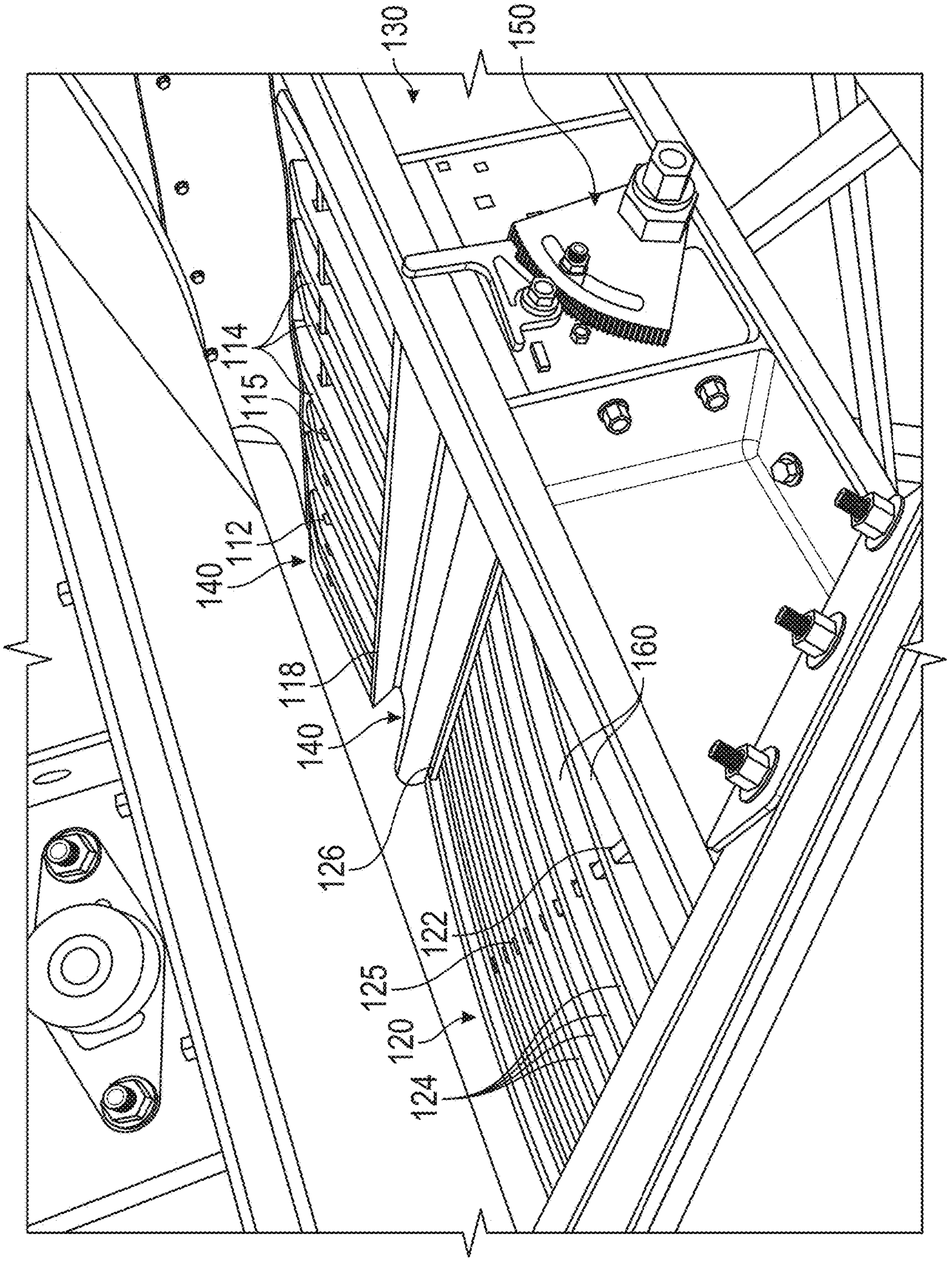
FIG. 2 is an enlarged partial isometric view of the screening deck shown in FIG. 1, without screen assemblies mounted thereon, incorporated into a vibratory screening machine, according to an embodiment of the present disclosure.

FIGS. 1 and 2 illustrate various views of an exemplary screening deck or screen deck assembly 100. More specifically, FIG. 1 illustrates an isometric perspective view of screen deck assembly 100 while FIG. 2 illustrates the screen deck assembly attached to a screening machine. Screening deck assembly 100 includes a first screening deck 110, a second screening deck 120, side channels 130 and 130', a wash tray 140, and tensioning devices 150. As is shown in FIG. 1, first screening deck 110 and second screening deck 120 are covered by a first screen assembly 109 and a second screen assembly 119, respectively. Portions of screens 109, 119 have been cutaway to show aspects of decks 110, 120 below the screens. First screen assembly 109 and second screen assembly 119 are replaceable screen assemblies which are attached to first and second screening decks 110 and 120. When in operation, material to be screened 50 by a vibratory screening machine is discharged from feed outlet ducts of a feed assembly (not shown) to an elevated side of first screen assembly 109, along feed end 109A of first screen assembly 109, and is vibrated across first screen assembly 109 of first screening deck 110, over discharge end 109B of first screen assembly 109, and into wash tray 140.

In the exemplary embodiment, vibration carries material 50 over wash tray 140, where material passes over feed end 119A of second screen assembly 119. Material 50 hits second screen assembly 119 in screen impact area 148, then vibrates across second screen assembly 119 of second screening deck 120, and over discharge end 119B of second screen assembly 419. First screen assembly 109 and second screen assembly 119 are configured such that undersized materials fall through first screen assembly 109 and second screen 119 into undersized material collecting pans (not shown) and are funneled into undersized collection assembly (not shown). Oversized materials do not pass through screens 109 and 119 and are vibrated off discharge end 119B and funneled through an oversized collection assembly. Direction of the flow of material 50 is represented with arrows.

FIG. 2 illustrates a partial side perspective view of screening decks 110 and 120, wash tray 140, side channel 130, and a portion of a tensioning device 150. As is shown in FIG. 2, first screening deck 110 and second screening deck 120 do not include screens 109 and 119, but it will be appreciated that first and second screening decks 110 and 120 are covered by screens 109 and 119 when employed to separate materials of varying sizes, and these screens can be replaced when worn or damaged.

Referring to FIG. 2, first screening deck 110 includes an underlying rib 112, stringers 114 (e.g., support structures), an upper end plate 116 and a lower end plate 118. Second screening deck 120 includes an underlying rib 122, stringers 124, an upper end plate 126 and a lower end plate 128. Opposite ends of ribs 112 and 122 extend from side channel 130 and 130' at each of the midpoints between upper end plate 116 and lower end plate 118 of first screening deck 110, and upper end plate 126 and lower end plate 128 of second screening deck 120, respectively. A plurality of stringers 114 and 124 extend from upper end plates 116 and 126 to lower endplates 118 and 128, respectively. A midpoint 115 of each stringer 114 and a midpoint 125 of each stringer 124 traverses the top surface of ribs 112 and 122. Midpoints 115 and 125 may be elevated with respect to opposite ends of stringers 114 and 124 such that stringers 114 and 124 may but need not, create a "crown" or convex curvature across first and second screening decks 110 and 120. Alternatively, the stringers 114 and 124 may form a concave profile or flat profile across the first and second screening decks. Though first screening deck 110 and second screening deck 120 are shown with a single rib 112 and 122 respectively, it will be appreciated that first screening deck 110 and second screening deck 120 may include other configurations. First screening deck 110 and second screening deck 120 may include, respectively, a first plurality of ribs and a second plurality of ribs, as long as the additional ribs provide the functionality as described herein. In some embodiments at least one (or, in some embodiments, each one) of the first plurality of ribs and the second plurality of ribs can be assembled similarly to rib 112 or rib 122. Stringer 114 and 124 may be fixed (e.g., welded) to the underlying ribs 112, 122. Alternatively, stringers 114 and 116 may be replaceable units and may be fastened to the ribs using various fasteners, such as bolts.

Figure 3:
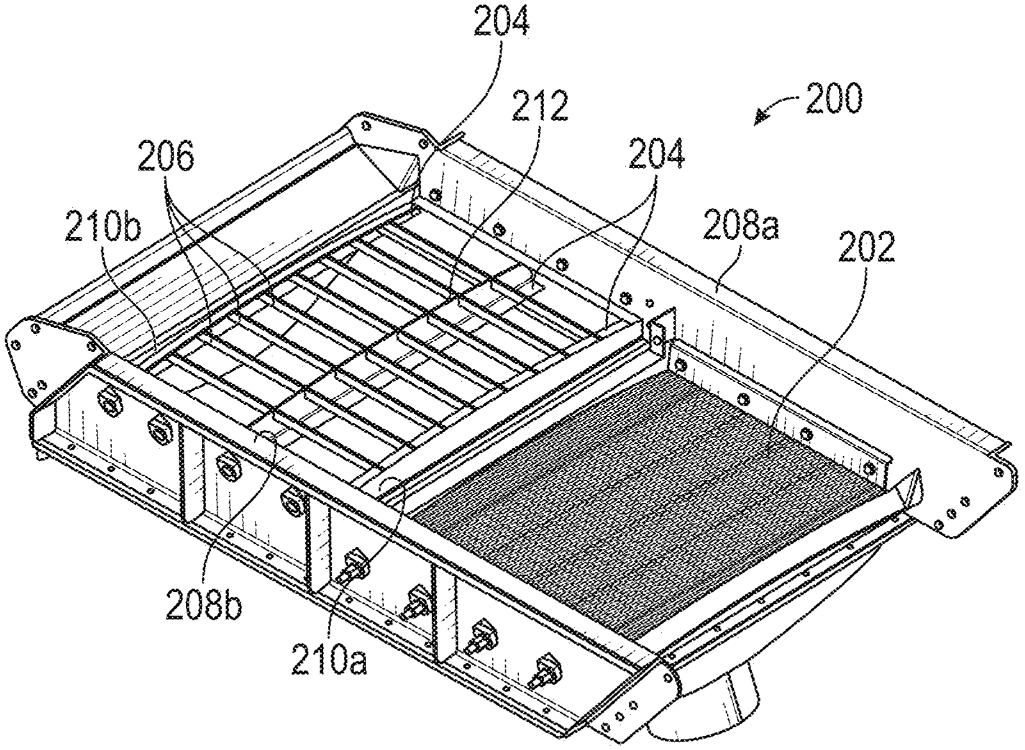
FIG. 3 is an isometric view of a screening deck having a screen assembly mounted thereon, according to an embodiment of the present disclosure.

FIG. 3 is an isometric view of a screening deck 200 having a screen assembly 202 mounted thereon, according to one or more embodiments of the present disclosure. In this embodiment, screening deck 200 may employ a tensioning mechanism that holds screen assembly 202 by providing side-to-side tension, in contrast to the end-to-end embodiments shown, for example, in FIGS. 1 and 2 that provide front-to-back tensioning. In this example, a tensioning mechanism provides tension to screen assembly 202 from above, as described in greater detail in U.S. Pat. No. 9,010,539, the disclosure of which is incorporated by reference herein in its entirety. The tensioning mechanism in screening deck 200, in which tension is applied from above, is also in contrast to the embodiments of FIGS. 1 and 2 in which tension is applied from below via a ratcheting mechanism.

Screening deck 200 includes screen assembly 202 in a first screening portion of screening deck 200. A second screening portion of screening deck 200 is shown without a screen assembly to reveal a plurality of ribs 204 that provide structural support for a plurality of stringers 206. As described above with reference to FIG. 2, stringers 206 provide structural support of a screening assembly such as screening assembly 202. In this example, ribs 204 extend between side channels 208*a* and 208*b*. Stringers 206 extend from end plate 210*a* to 210*b*. A midpoint 212 of each stringer 206 traverses a top surface of a central rib of ribs 204. In this example, midpoints 212 are elevated with respect to opposite ends of stringers 206 such that stringers 206 create a "crown" or convex curvature across screening portions of screening deck 200.

Stringers 206 may be replaceable units and may be fastened to ribs 204 rather than welded to ribs 204. Stringers 206 may be fastened to ribs 204 using various fasteners such as bolts. This configuration eliminates closely spaced weld joints between ribs 204 and stringers 206 that are commonly found in welded screening decks. This arrangement eliminates the shrink, heat distortion, and drop associated with closely spaced weld joints, and enables rapid replacement of worn or damaged stringers 206 in the field. Replaceable stringers 206 may include plastic, metal, and/or composite materials and may be constructed by casting and/or injection molding. Other embodiment screening systems may include removable and replaceable stringers.

Figure 4A:
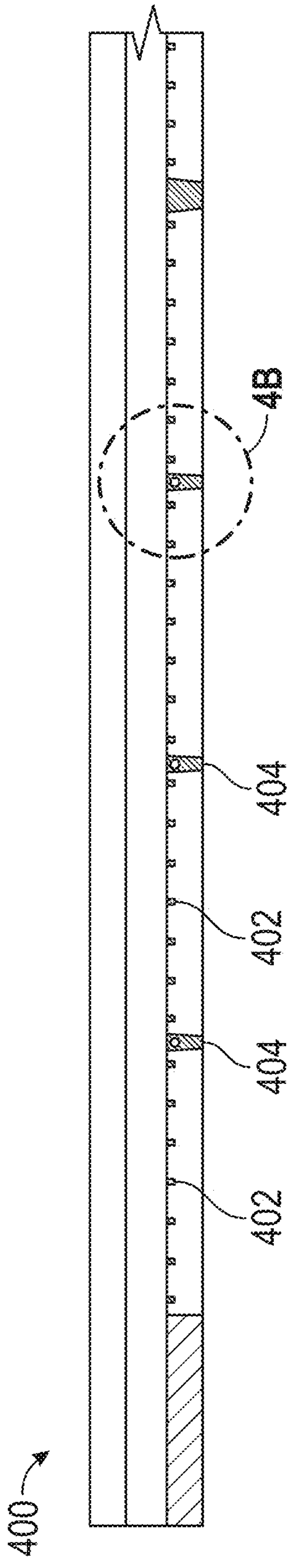
FIG. 4A is a partial cross-section view of a portion of a screen element, according to an embodiment of the present disclosure.

FIG. 4A illustrates a fragmented cross-sectional view of a portion of a screen 400 that can be used with a screen deck assembly like the ones disclosed above. The screen 400 includes first members 402 that extend parallel to one another across the screen. Second members that extend in a direction perpendicular to the first members 402 form a grid structure with the first members 402. The screen 400 further includes third members 404 that extend in a direction parallel to the first members 402 and which are formed periodically along the screen 400. The third members 404 are thicker in both width and height than the first members 402. As illustrated in the enlarged view in FIG. 4B, a stiffening rod 406 is encapsulated in the material of each of the third members 404. The stiffening rods 406 are provided to help the screen 400 maintain a uniform, substantially flat shape when the screen 400 is laying on the ribs and/or stringers of a screen deck. In other words, the stiffening rods 406 help to prevent the screen from sagging between adjacent stingers or ribs of a screen deck. The stiffening rods 406 may also provide additional strength to the screen 400.

Figure 5:
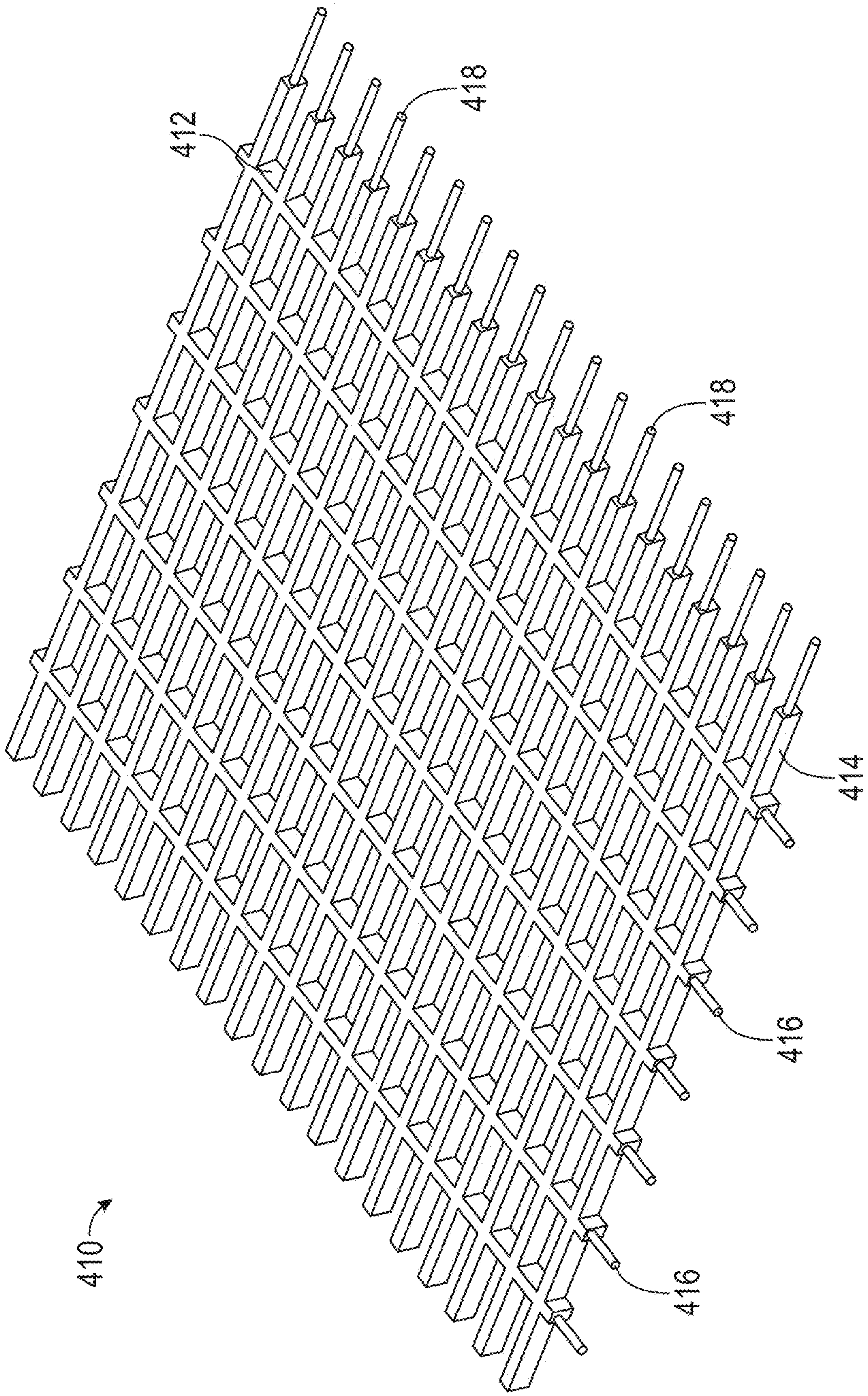
FIG. 5 is a perspective view of a screen element that incorporates reinforcing members, according to an embodiment of the present disclosure.

FIG. 5 illustrates an alternate embodiment of a screen 410 that could be used in a screen deck assembly like the ones described above. In this embodiment, the screen 410 includes first members 412 that extend parallel to one another in a first direction. Second members 414 extend parallel to one another in a second direction that is perpendicular to the first direction, thereby forming a grid array with the first members 412. Stiffening elements 416 are molded into the material of the first members 412 and similar stiffening elements 418 are molded into the material of the second elements 414. Here again, the stiffening elements 416, 418 are provided to help the screen 410 maintain a uniform, substantially flat shape when the screen 400 is laying on the ribs and/or stringers of a screen deck. Typically, at least a portion of such stiffening elements 416 and/or 418 are oriented transverse or perpendicular to the stringers. Thus, the stiffening elements help to prevent the screen 410 from sagging between adjacent stringers or ribs of a screen deck. The stiffening elements 416, 418 may also provide additional strength to the screen 410 to help resist stretching or lengthening of the screen 410. In other embodiments, one set of stiffening elements 416 or 418 may be omitted. Further, such stiffening elements 416 or 418 may not be included in each first member 412 or second member 414, respectively. For instance, stiffening elements 416 or 418 may be included in every other or every third first member 412 or second member 414, respectively.

Figure 4B:
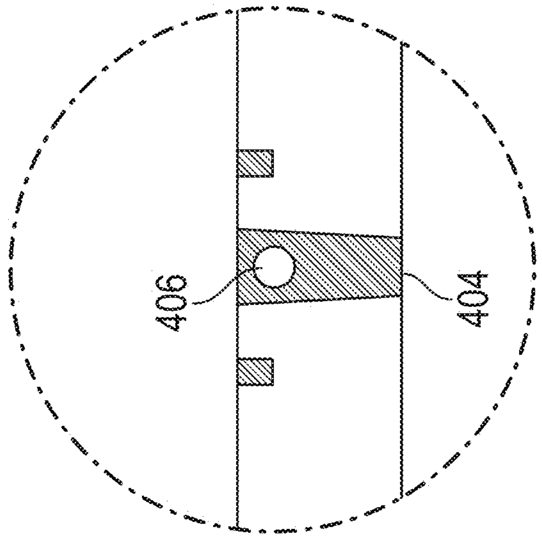
FIG. 4B is an enlarged view of a portion of the screen element illustrated in FIG. 4A, according to an embodiment of the present disclosure.

Details of screens as depicted in FIGS. 4A, 4B and 5 can be found in U.S. Pat. No. 9,908,150, the entire content of which is incorporated herein by reference.

In the examples described above, the stiffening rods or stiffening elements may be molded into the material of the screen itself. This could be done in connection with molding of screens formed of thermoset materials, such as polyurethane. However, other types of screens, such as those formed by injection molding of a thermoplastic also can incorporate stiffening rods or stiffening elements. Further, separate stiffening rods or stiffening elements may be attached to screens by adhesives, welding, fusing and other attachment techniques. Thus, screens that are used in vibratory screening machines can include various different types of stiffening rods or stiffening elements, and the stiffening rods or stiffening elements can be incorporated into or attached to screens in a variety of different ways.

Regardless of how a screen that includes stiffening rods or stiffening elements is formed, the inclusion of the stiffening rods or stiffening elements adds cost and complexity to the screens. The manufacturing processes which are required to create such screens are necessarily more complex and expensive than if the screens did not include stiffening rods or stiffening elements. Also, once the stiffening rods or stiffening elements have become a part of a screen, their existence in the screen constrains how the screens can be packaged and shipped. In most instances, it is desirable for the stiffening rods or stiffening elements to retain their general shape, which can make it impossible to roll or fold a screen in certain ways to reduce its dimensions for packaging and shipping. Further, inclusion of such stiffening rods or elements results in additional waste when screens are discarded.

Figure 6:
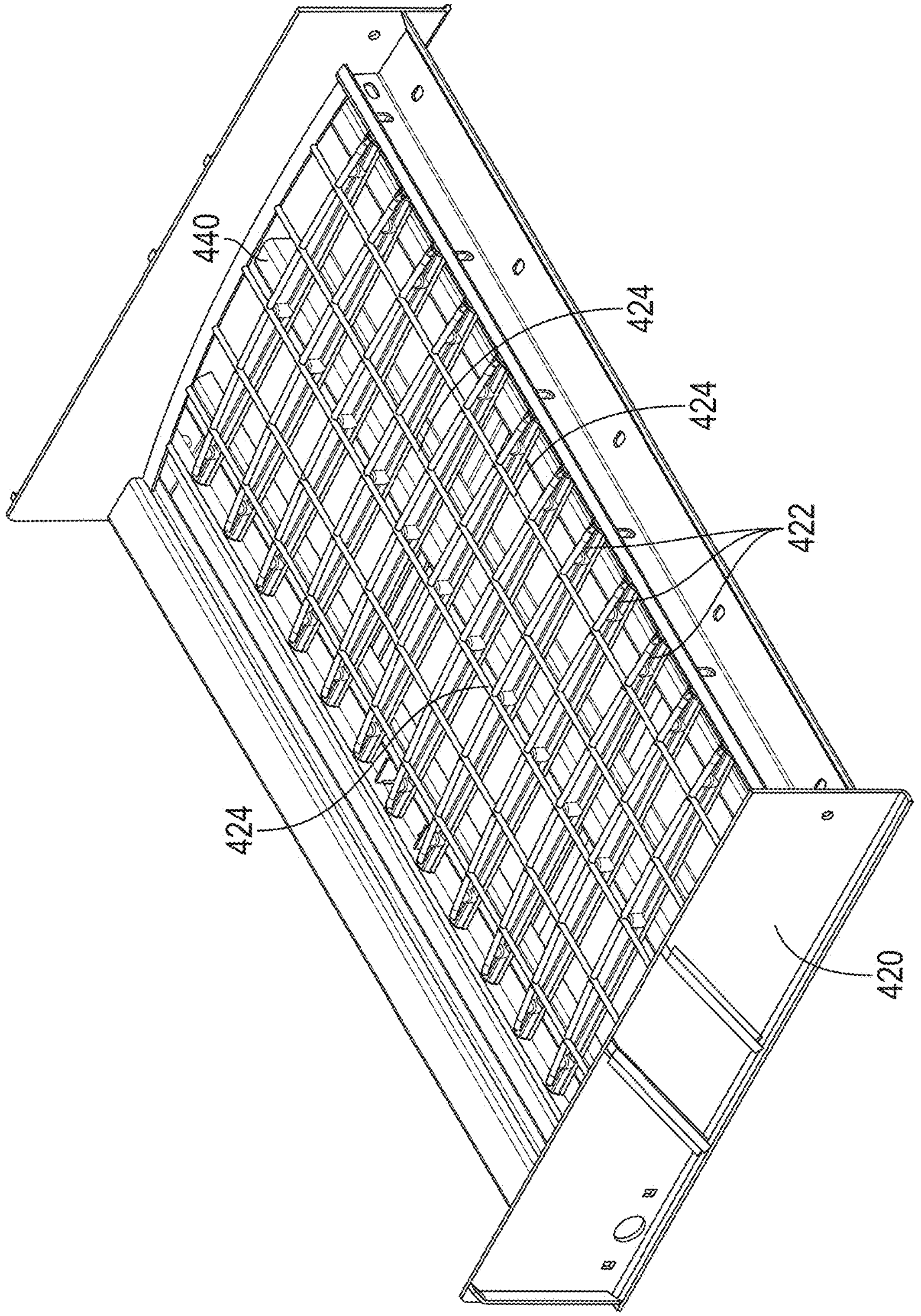
FIG. 6 is a perspective view of a screen deck that includes supporting rods mounted on stringers, according to an embodiment of the present disclosure.

FIG. 6 illustrates a screen deck 420 of a vibratory screening machine which includes support rods 424 that are installed across the top edges of the stringers 422 of the screen deck. The support rods 424 are provided to support the screen that is mounted on top of the screen deck 420 so that the screen does not sag between adjacent stringers 422. Thus, the support rods 424 perform some of the same functions as the stiffening rods or stiffening elements that are provided in or on the screens described above. When support rods 424 are installed on the stringers 422 of a screen deck 420 as illustrated in FIG. 6, screens that do not include stiffening rods or stiffening elements can be mounted on the screen deck 420 without fear of the screen sagging between adjacent stringers 422. The screen deck 420 may additionally include one or more optional ribs 440 that extend across lower portions of the stringers 422. Such ribs 440 may provide support between. Incorporation of such rods 420 into the screen deck 420 allows the rods 420 to be reused when overlying screens are replaced.

Figure 7:
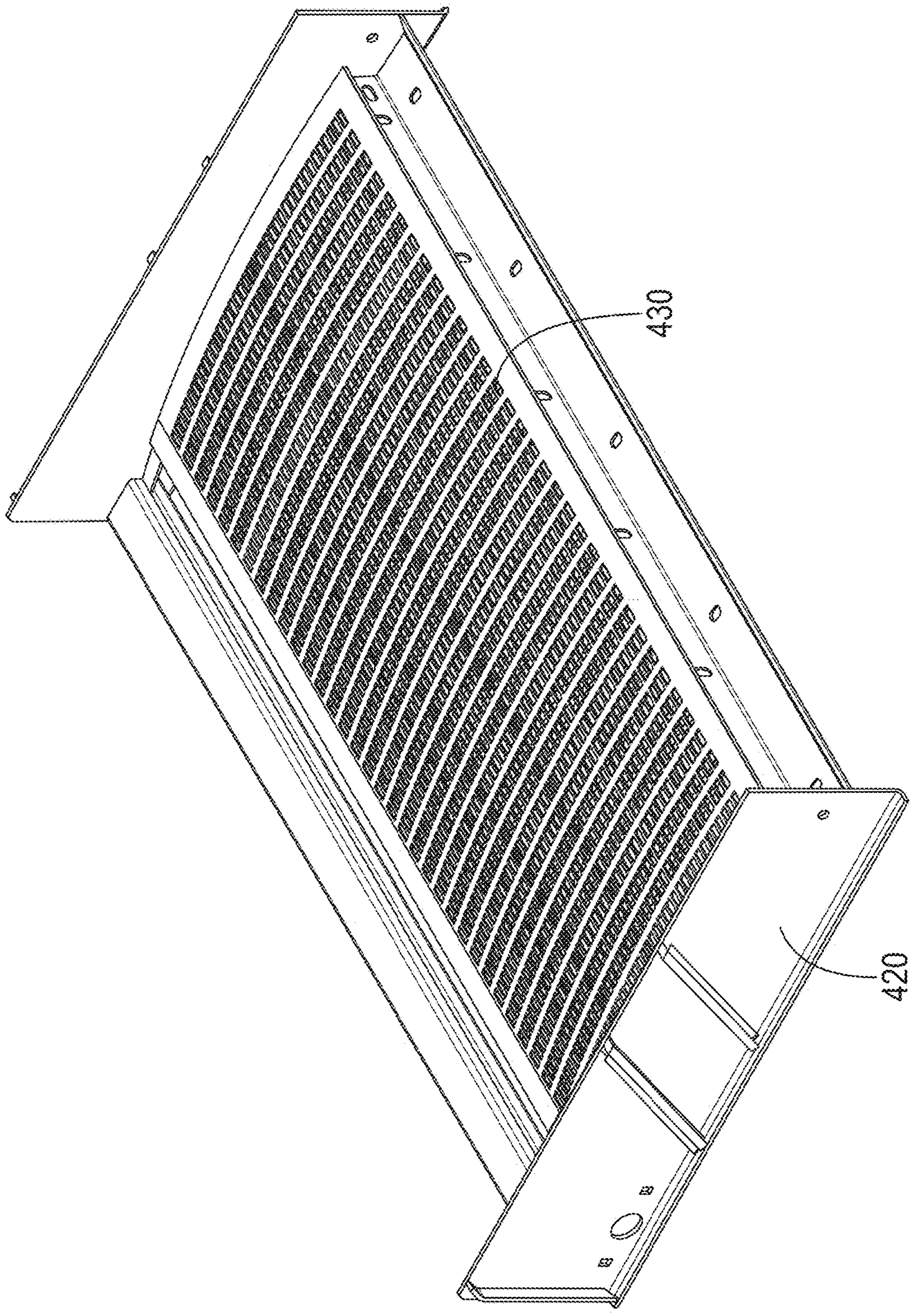
FIG. 7 is a perspective view of a screen deck like the one illustrated in FIG. 6 with a screen mounted over the stringers and support rods, according to an embodiment of the present disclosure.

FIG. 7 illustrates a screen deck 420 that includes support rods 424 mounted across the top of stringers 422 of the screen deck 420 with a screen 430 mounted over the screen deck 420.

Figure 8:
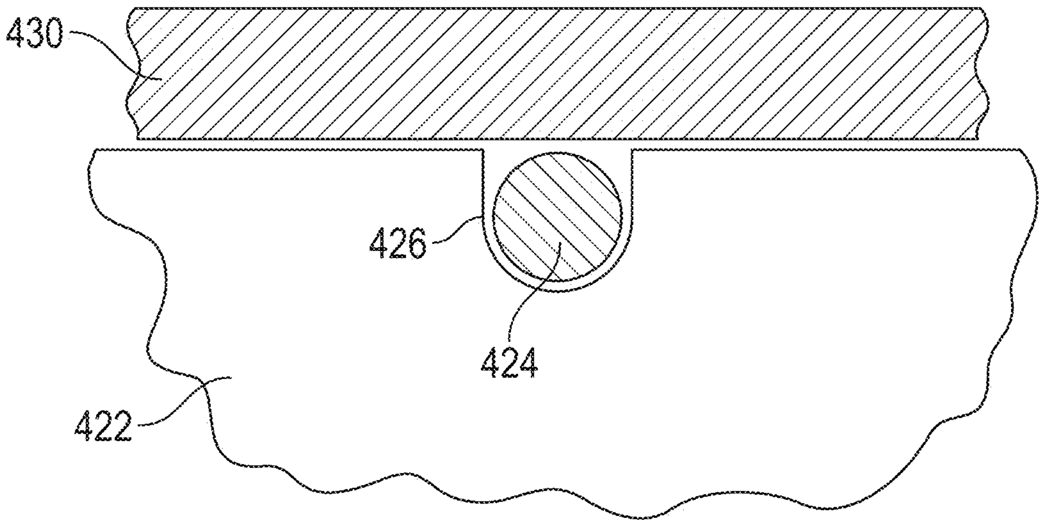
FIG. 8 is a cross-sectional view illustrating how a support rod of a first embodiment of a screen deck is mounted on the top of a stringer, according to an embodiment of the present disclosure.

FIG. 8 is an enlarged cross-sectional view illustrating how a support rod 424 is installed in a mounting aperture 426 located on a top edge of a stringer 422. A screen 430 overlays the stringer 422 and support rod 424. As illustrated in FIG. 8, a depth of the mounting aperture 426 is such that a top surface of the support rod 424 is substantially flush with the top edge of the stringer 422. FIG. 8 also depicts that a contour of the mounting aperture 426 may match an exterior profile of the support rod 424.

The support rods 424 could be formed from a variety of different materials. The support rods 424 could be formed of metal, synthetics, fiberglass, carbon fiber and resin and a variety of other similar materials.

Figure 9:
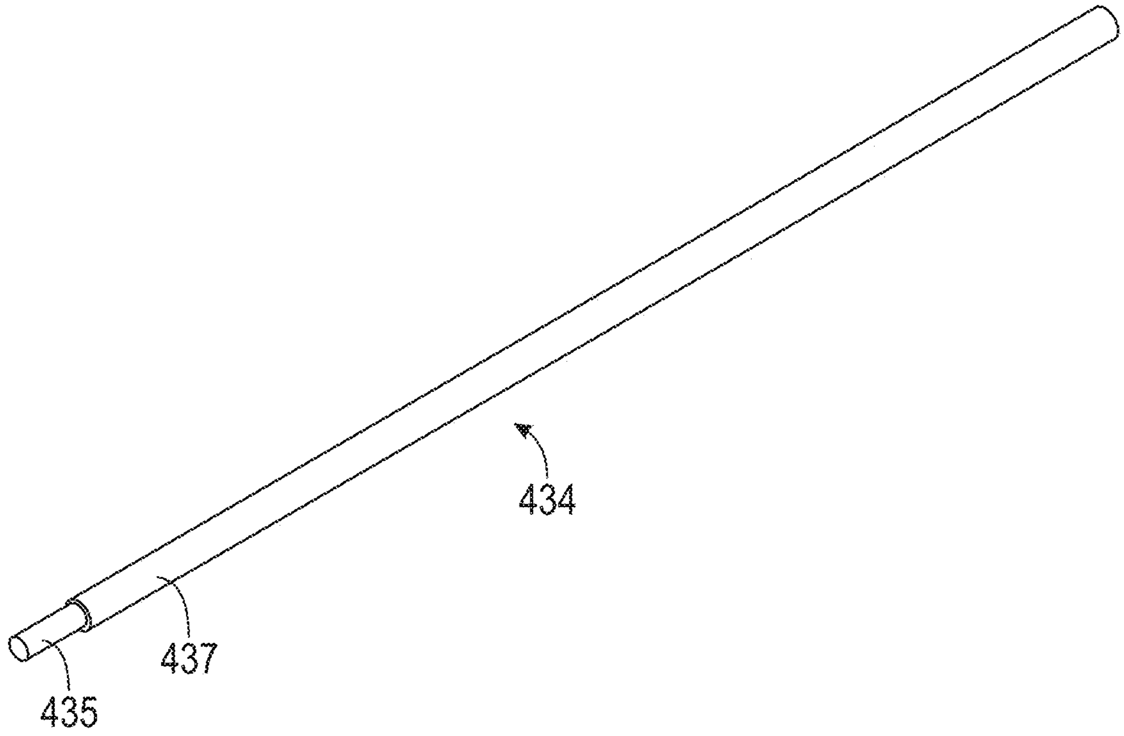
FIG. 9 is a perspective view of a support rod that can be incorporated into a screen deck assembly, according to an embodiment of the present disclosure.

Each support rod 424 could be a single monolithic structure, or each support rod could have a composite structure. For example, FIG. 9 illustrates an embodiment of a support rod 434 that includes a core 435 surrounded by a cover 437. The core 435 could be made of a relatively stiff material such as metal, fiberglass, carbon fiber or a hard plastic or synthetic material. The cover 437 could be made of a softer material such as a plastic or synthetic material.

The cover 437 could be somewhat deformable to facilitate the insertion of the support rod 434 into a mounting aperture 426 of a stringer 422. The cover 437 could also be sized to substantially or completely fill the mounting apertures 426 into which the support rod 434 is mounted. This could help to prevent the support rod 434 from moving with respect to the stringers 422 into which the support rod 434 is mounted, which in turn can help to prevent vibration and wear of the support rod 434 and stringers 422.

The support rods 424 can have various different cross-sectional shapes or profiles. In the embodiments illustrated in FIGS. 6-12 the support rods 424/434 have a circular cross-sectional shape. In alternate embodiments, the support rods 424/434 could have a square, triangular, oval, polyhedron or some other cross-sectional shape. Also, the support rods 424/434 could be flat or straight, or have a curved, arched or bent shapes depending on how the screen deck to which they are attached is shaped. In other words, the shape of the support rods 424/434 can vary to accommodate the shape or profile of the screen deck to which they are attached.

Similarly, the mounting apertures 426 in the stringers 422 can have different shapes. In some embodiments, the profile of the mounting apertures 426 can match the exterior profile of the support rods 424 that are mounted in the mounting apertures 426. In other instances, the profile of the mounting apertures 426 can be different from the exterior profile of the support rods 424.

FIG. 8 illustrates an embodiment where the depth of the mounting apertures 426 and the diameter of the support rods 424 are selected so that the top surface of the support rod 424 is substantially flush with the top surface of the stringers 422. This allows a screen 430 with a substantially flat lower surface to lay flat on the supporting surface formed by the stringers 422 and support rods 424.

Figure 10:
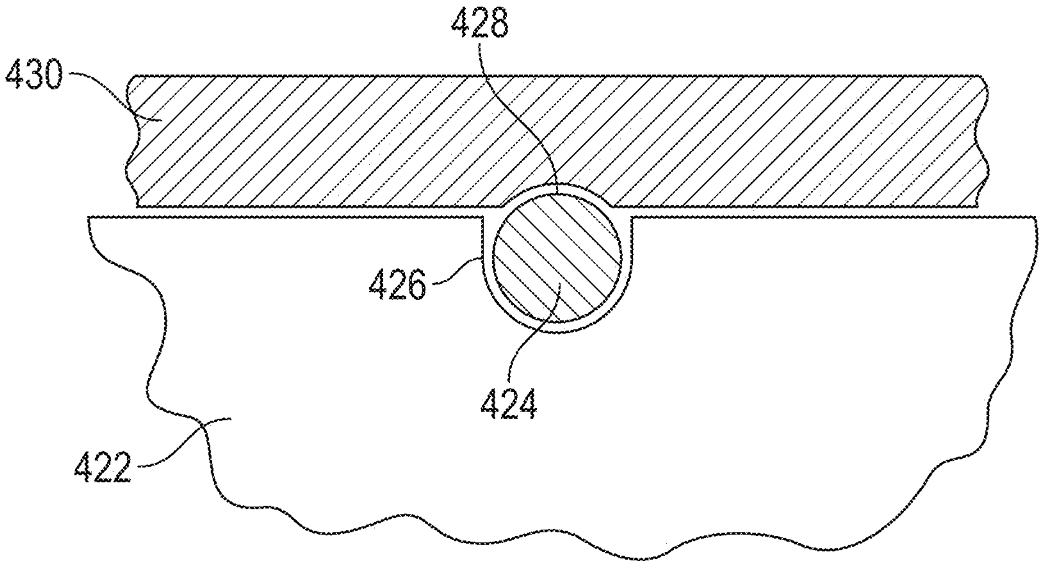
FIG. 10 is a cross-sectional view illustrating how a support rod of a second embodiment of a screen deck is mounted on the top of a stringer, according to an embodiment of the present disclosure.

In alternate embodiments, such as the one shown in FIG. 10, the screens 430 may be formed so that the lower surface of the screen 430 includes locating grooves 428. The locating grooves 428 are designed to lay over and engage with corresponding support rods 424. For this reason, the depth of the mounting apertures 426 in this embodiment are such that the top surfaces of the support rods 424 protrude above the top edges of the stringers 422. This allows the top surfaces of the support rods 424 to be received in the grooves 428 on the bottom surface of the screen 430.

In the embodiment illustrated in FIG. 10, the support rods 424 have a circular cross-sectional shape and the groove 428 on the bottom surface of the screen 430 has a corresponding rounded profile. In alternate embodiments, the support rods 424 could have different cross-sectional shapes, and the profile of the grooves 428 on the bottom surface of the screen 430 could have a correspondingly different shape.

Figure 11:
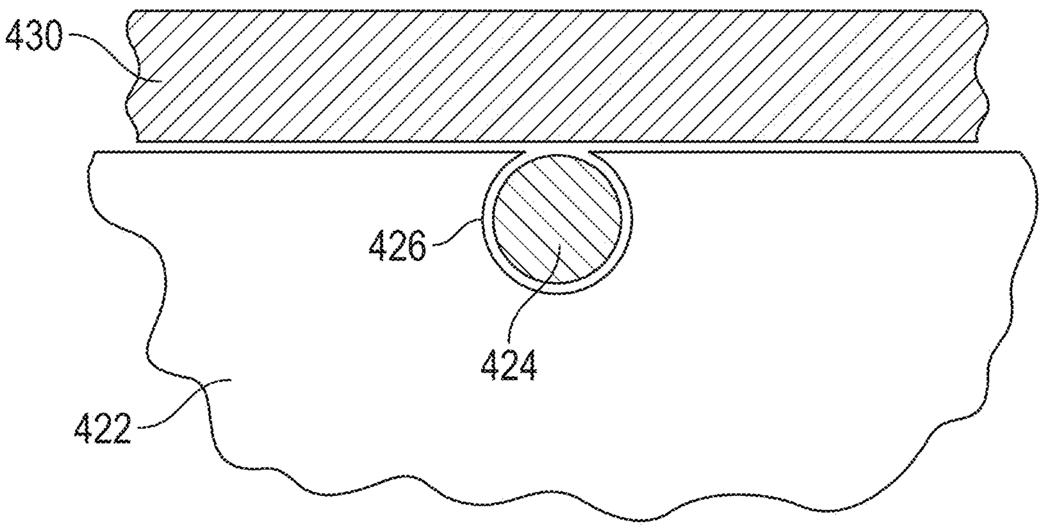
FIG. 11 is a cross-sectional view illustrating how a support rod of a third embodiment of a screen deck is mounted on the top of a stringer, according to an embodiment of the present disclosure.

FIG. 11 illustrates an embodiment where the mounting apertures 426 on the top edges of the stringers 422 are shaped to help hold the support rods 424 in the mounting apertures 426. In the embodiment illustrated in FIG. 11, the mounting aperture 426 has a generally circular cross-sectional shape to match the cross-sectional shape of the support rod 424. However, the dimension of the opening of the mounting aperture 426 along the top edge of the stringer 422 is smaller than the diameter of the support rod 424. As a result, inserting the support rod 424 into the mounting aperture 426 will require a temporary elastic deformation of the material of the stringer 422 and/or the support rod 424. Once the support rod 424 is seated in the mounting aperture 426, the material of the stringer 422 and/or the support rod 424 substantially returns to its original shape, which results in the support rod 424 being held in the mounting groove 426.

Figure 12:
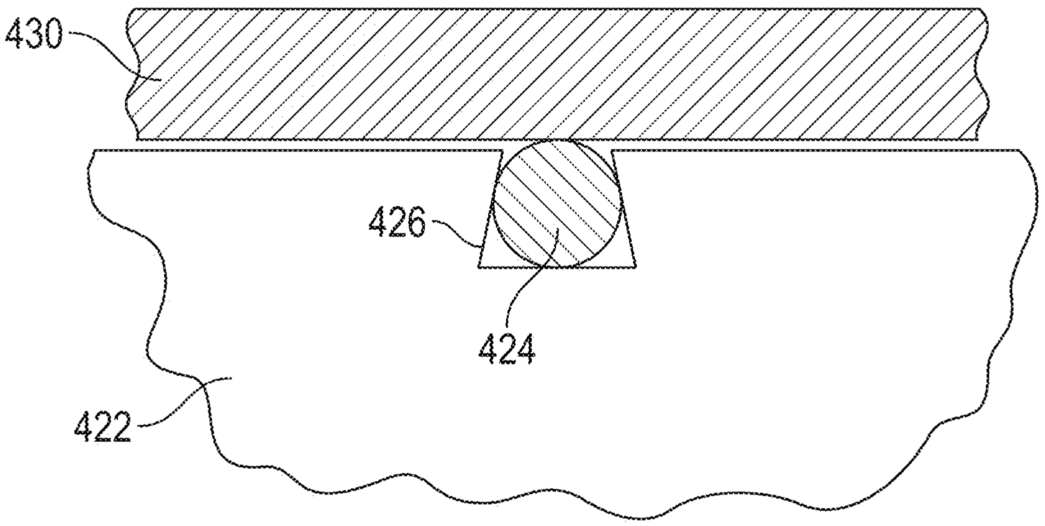
FIG. 12 is a cross-sectional view illustrating how a support rod of a fourth embodiment of a screen deck is mounted on the top of a stringer, according to an embodiment of the present disclosure.

FIG. 12 illustrates an alternate embodiment where the dimensions of the opening at the top of the mounting aperture 426 is also smaller than a diameter of the support rod 424. Here again, inserting the support rod 424 into the mounting aperture 426 will require a temporary elastic deformation of the material of the stringer 422 and/or the support rod 424. Once the support rod 424 is seated in the mounting aperture 426, the material of the stringer 422 and/or the support rod 424 substantially returns to its original shape, which results in the support rod 424 being held in the mounting groove 426.

FIG. 12 also provides an example of how the profile of the mounting aperture 426 need not match the exterior cross-sectional shape of the support rod 424. Indeed, the profile of the mounting groove 426 and the cross-sectional shape of the support rod 424 can be deliberately selected to be different for various reasons, such as helping to keep the support rod 424 trapped inside the mounting aperture 426.

In the embodiments described above, the stringers 422 can be formed from a variety of different materials. In some instances, wear protective covers may be mounted over top of the stringers. When wear protective covers are provided, mounting grooves 426 may be formed in both the top edge of the stringer and in the covers. Alternatively, the top edge of a stringer could lack mounting grooves for support rods, and the mounting grooves for the support rods could be provided only in the cover mounted over top of the stringer.

Figure 13:
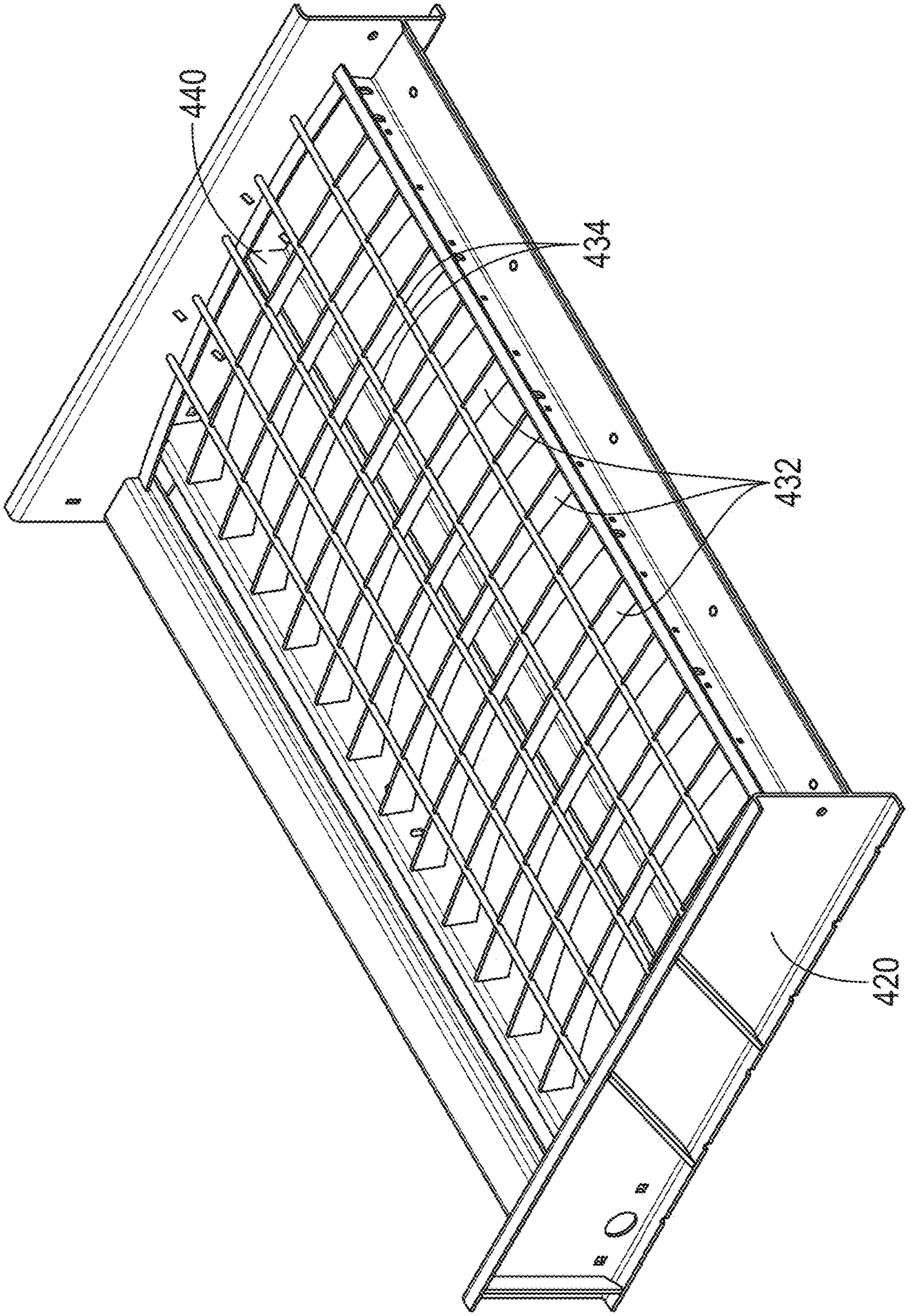
FIG. 13 is a perspective view of a screen deck that having stringers forming a part of the screen deck, according to an embodiment of the present disclosure.

FIG. 13 shows an alternate embodiment in which metal stringers 432 form a part of the screen deck 420. Here again, mounting apertures are formed in the top edges of the stringers 432, and support rods 434 are mounted in the mounting apertures. Thus, in some embodiments, the stringers 432 could be formed of a metal material and lack any sort of wear protective covers.

In the foregoing embodiments the support rods are mounted in mounting apertures in the top edges of the stringers. In alternate embodiments, the support rods 424 could be attached to the stringers 422 via fasteners, adhesives, welding, fusing and a variety of other ways. In some embodiments, the support rods 424 are removably attached to the stringers 422 so that individual support rods can be replaced, and so that individual stringers can be replaced. In alternate embodiments, the support rods 424 may be affixed to the stringers in a more permanent fashion, such as by fusing, adhesives and/or welding.

In the embodiments described above, the support rods extend in a direction that is substantially perpendicular to the direction in which the stringers extend. In alternate embodiments, the support rods could extend in directions that are not perpendicular to the direction in which the stringers extend. For example, the support rods could form a 30° or 45° angle with respect to the stingers, or some other angle that is other than 90°.

In the embodiments described above, the plurality of stringers may have a mid-point between first and second ends that is elevated relative to the first and second ends. In such an embodiment, the stringers may create a "crown" or convex curvature across the screen deck. In alternate embodiments, the plurality of stringers may have a mid-point between first and second ends that is depressed relative to the first and second ends. In such an embodiment, the stringers may create a concave curvature across the screen deck. In further alternate embodiments, the plurality of stringers may have a linear profile between first and second ends forming a substantially a flat surface across the screen deck.

Conditional language, such as, among others, "can," "could," "might," or "may" unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

While embodiments of this disclosure are described with reference to various embodiments, it is noted that such embodiments are illustrative and that the scope of the disclosure is not limited to them. Those of ordinary skill in the art may recognize that many further combinations and permutations of the disclosed features are possible. As such, various modifications may be made to the disclosure without departing from the scope or spirit thereof. In addition or in the alternative, other embodiments of the disclosure may be apparent from consideration of the specification and annexed drawings, and practice of the disclosure as presented herein. The examples put forward in the specification and annexed drawings are illustrative and not restrictive. Although specific terms are employed herein, they are used in a generic and descriptive sense only and not for purposes of limitation.

What is claimed is:

1. A screen deck for use in a vibratory screening machine, comprising:

a frame that is configured to be mounted to a vibratory screening machine;

a plurality of stringers mounted on the frame and arranged substantially parallel to one another;

mounting apertures are provided on upper portions of the stringers and a plurality of support rods mounted to the stringers, wherein each support rod extends between and is coupled to at least two of the stringers, wherein each support rod is at least partially located within mounting apertures of two or more stringers, wherein a depth of the mounting apertures and a cross-sectional dimension of the support rods are such than when the support rods are located within corresponding ones of the mounting apertures, top edges of the support rods are at substantially the same height as the top edges of the stringers in which the support rods are mounted, and wherein the stringers and support rods are configured to support a screen assembly.

2. The screen deck of claim 1, wherein the plurality of stringers extend in a first direction and wherein at least some of the plurality of support rods extend in a second direction that is transverse to the first direction.

3. The screen deck of claim 1, wherein the second direction is substantially perpendicular to the first direction.

4. The screen deck of claim 1, wherein mounting apertures are provided on upper portions of the stringers and wherein each support rod is at least partially located within mounting apertures of two or more stringers.

5. The screen deck of claim 1, wherein an opening is formed at the top of each mounting aperture, and wherein a width of the opening of each mounting aperture is smaller than a diameter of the support rod located in the mounting aperture.

6. The screen deck of claim 1, wherein an interior profile of the mounting apertures substantially matches a cross-sectional shape of the support rods.

7. The screen deck of claim 1, wherein an interior profile of the mounting apertures is different from a cross-sectional shape of the support rods.

8. The screen deck of claim 1, wherein each of the plurality of support rods comprises a core and a cover surrounding the core, and wherein the cover of each support rod is formed of a deformable material such that the cover can be at least partially deformed when the support rod is inserted into corresponding mounting apertures of stringers.

9. The screen deck of claim 1, wherein each of the plurality of support rods comprises a core and a cover surrounding the core.

10. The screen deck of claim 1, wherein each of the plurality of stringers has an upper surface defining a convex profile.

11. The screen deck of claim 1, wherein each of the plurality of stringers has an upper surface defining a linear profile.

12. The screen deck of claim 1, further comprising:

at least one rib that extends between and is coupled to at least two of the stringers, wherein the rib is disposed below top edges of the stringers in which they are coupled.

13. A vibratory screening machine incorporating the screen deck of claim 1.

14. A stringer for a screen deck of a vibratory screening machine, comprising:

an elongated body configured to be attached to a screen deck assembly for a vibratory screening machine; and a plurality of mounting apertures formed along a top edge of the elongated body, wherein each mounting aperture is configured to receive a support rod that will, together with the elongated body, support a screening assembly, wherein a depth of each mounting aperture and a cross-sectional dimension of the support rod are such than when the support rod is located within a corresponding mounting aperture, a top edge of the support rod is at substantially the same height as a top edge of the elongated body in which the support rod is mounted.

15. The stringer of claim 14, wherein each mounting aperture includes an opening on the top edge of the elongated body and an inner surface that forms a depression extending inward from the top edge of the elongated body.

16. The stringer of claim 15, wherein the inner surface of each mounting aperture has a profile that matches a cross-sectional shape of a support rod that is to be mounted in the mounting aperture.

17. The stringer of claim 15, wherein the inner surface of each mounting aperture has a profile that is different from a cross-sectional shape of a support rod that is to be mounted in the mounting aperture.

18. The stringer of claim 15, wherein a width of the opening of each mounting aperture is smaller than a width of a support rod that is to be mounted in the mounting aperture.

19. The screen deck of claim 1, wherein the screen assembly overlays the stringers and support rods free of connection to the stringers and support rods.

20. The stringer of claim 14, wherein the screening assembly overlays the elongated and support rod free of connection to the elongated body and support rod.

* * * * *